P. BRADY.
Filter.
No. 212,089. Patented Feb. 11, 1879.
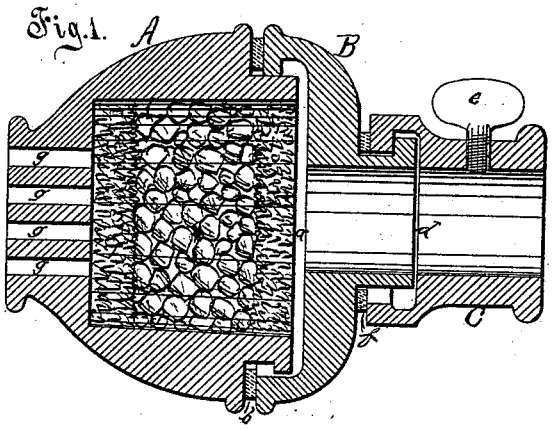
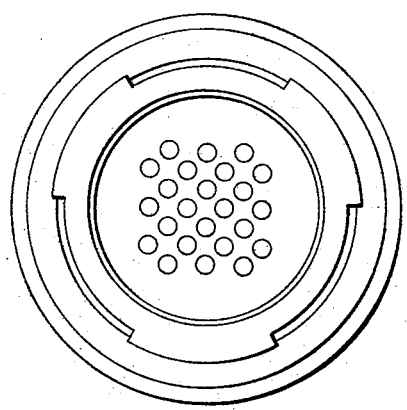
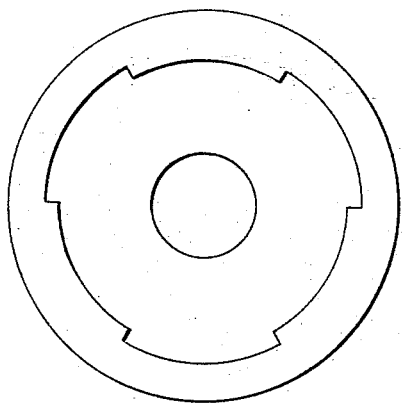
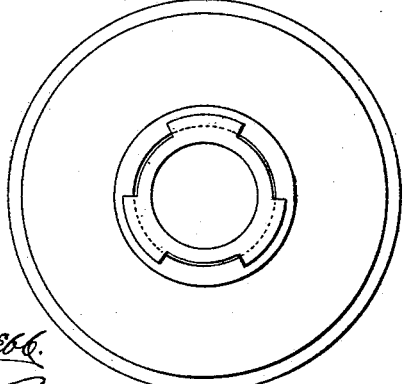
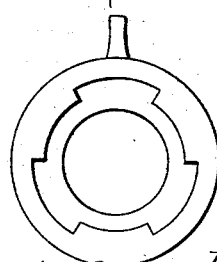

UNITED STATES PATENT OFFICE.

PATRICK BRADY, OF NEWARK, NEW JERSEY.

IMPROVEMENT IN FILTERS.

Specification forming part of Letters Patent No. 212,089, dated February 11, 1879; application filed March 19, 1878.

*To all whom it may concern:*

Be it known that I, PATRICK BRADY, of Newark, in the county of Essex and State of New Jersey, have invented a new and useful Improvement in Filters; and I do hereby declare that the following specification is a full, clear, and exact description of my said invention, reference being had to the accompanying drawings, in which—

Figure 1 is a vertical sectional view of my improved filter, showing it closed. Fig. 2 is a sectional view of the lower chamber, showing the perforated bottom. Fig. 3 is a sectional view of the joint which connects the upper and lower chambers. Fig. 4 is a top view of the joint which connects the band to the upper chamber. Fig. 5 is a sectional view of the band or pipe which connects the filter with the faucet.

Similar letters of reference indicate corresponding parts in all the figures.

The object of this invention is to produce a cheap and durable filtering apparatus which can be readily adjusted to any faucet, and easily removed, taken apart, cleansed, and replaced; and the invention consists in a filtering apparatus composed of three distinct separable parts or sections made of glass or other suitable material, and secured together by packed air-tight interlocking right and left joints, so that the said parts can be detached or connected by hand, as hereinafter specified.

In the accompanying drawings, A is the lower chamber of my improved filter, connected to the upper chamber, B, by an air-tight joint, $a$, surrounded by a packing of rubber or other suitable material, $b$, as shown in Fig. 1. The chambers A and B are preferably made of glass, so that the filter may be readily inspected whenever desired; but celluloid, rubber, metal, or other suitable material may be used, or the chamber A may be made of glass, and the chamber B of celluloid or other material, or vice versa.

C is a cylindrical plate or pipe, connected by an air-tight joint, $d$, to the chamber B, and having at its upper end a thumb-screw, $e$, so that the filter may be easily and securely attached to the faucet, and as readily detached.

The joint $d$ is encircled by a suitable packing, $f$, so as to render it impervious to water.

The bottom of the chamber A has a series of perforations, $g$, which form a reliable and durable sieve. In the lower part of the chamber A, I place a layer of animal charcoal or other suitable filtering and purifying matter, and above this a sponge or other fibrous material, as shown in Fig. 1.

In the filter heretofore constructed the sieve is liable to become worn and useless by the action of the water, rendering it frequently necessary to replace it. My construction of filter remedies this defect.

The perforations $g$ perform the functions of a sieve, and will not become inefficient by the action of the water.

What I claim as my invention, and desire to secure by Letters Patent, is—

As a new article of manufacture, a filtering apparatus, made of glass or other suitable material, composed of three distinct parts, in combination with packed air-tight interlocking right and left joints, so that the said parts can be detached or connected by hand, substantially as herein shown and described.

In testimony that I claim the above invention I have hereunto set my hand this 21st day of January, 1878.

PATRICK BRADY.

Witnesses:
ERNEST C. WEBB,
T. J. KEANE.